F. O. BLAKE.
HEATING AND MIXING PLANT.
APPLICATION FILED JULY 29, 1907.
924,132.
Patented June 8, 1909.
3 SHEETS—SHEET 1.
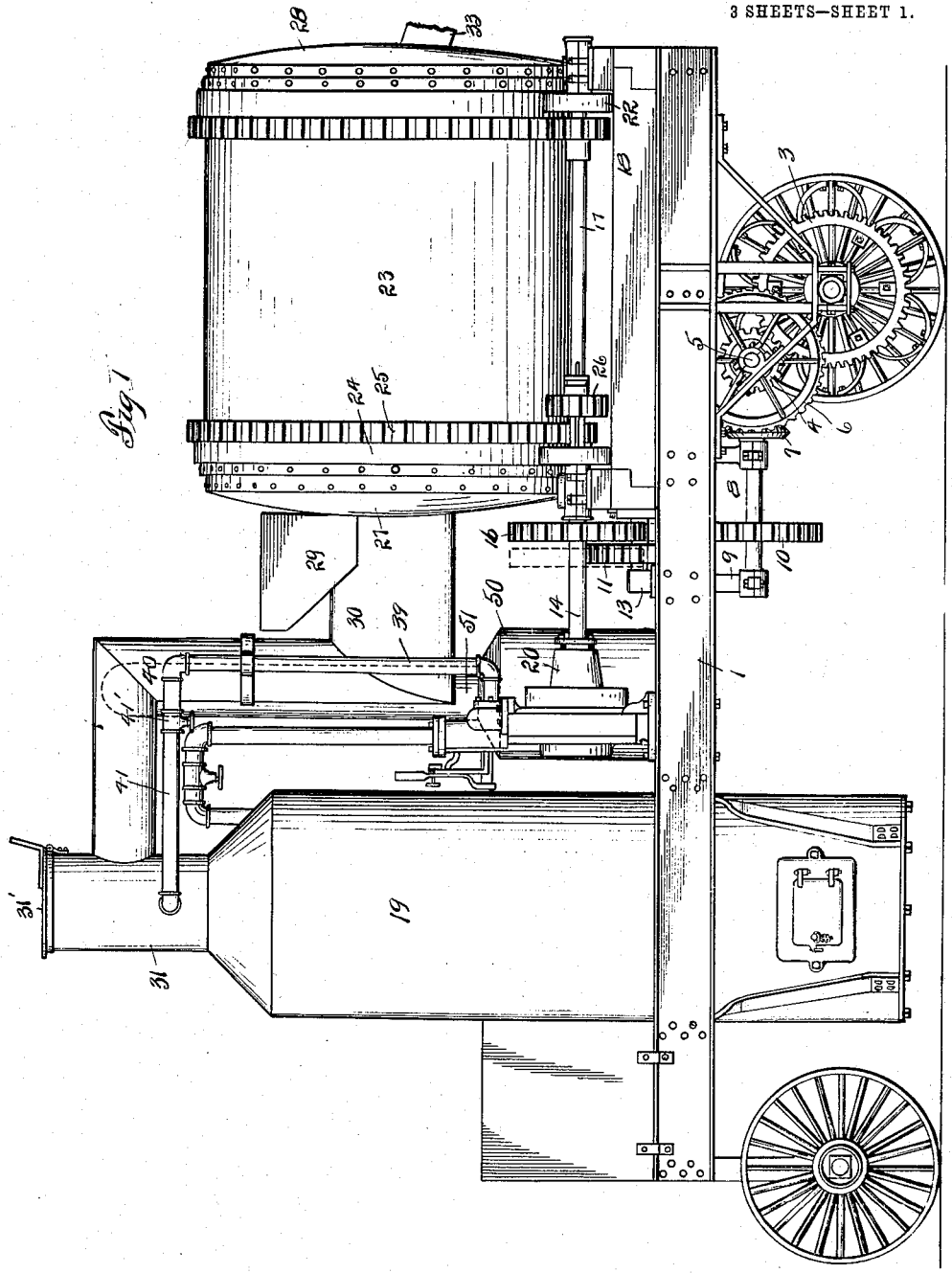
WITNESSES:
R. E. Hamilton
L. R. Hawes
INVENTOR.
Frank O. Blake
BY Arthur C. Brown
ATTORNEY.

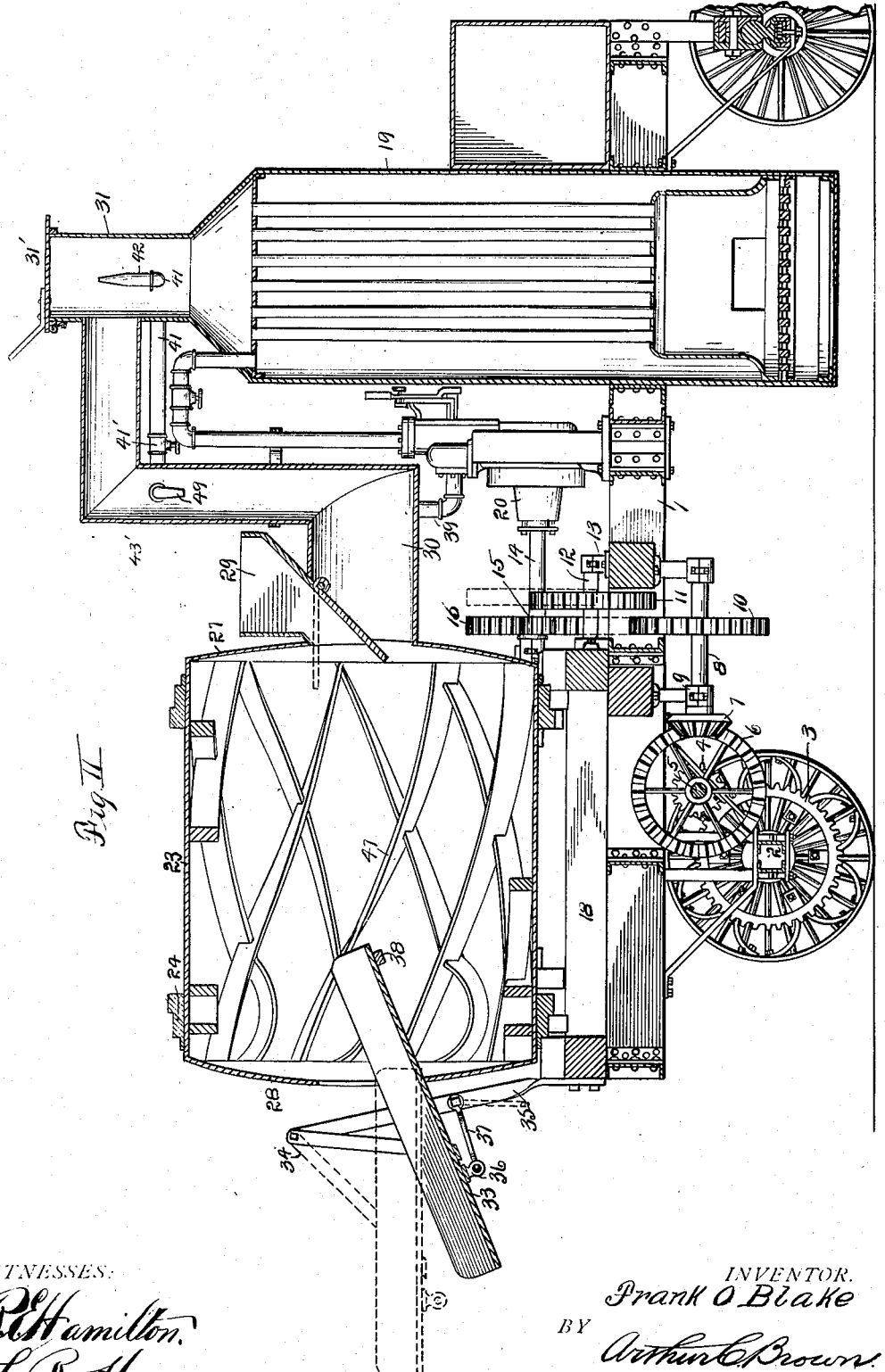

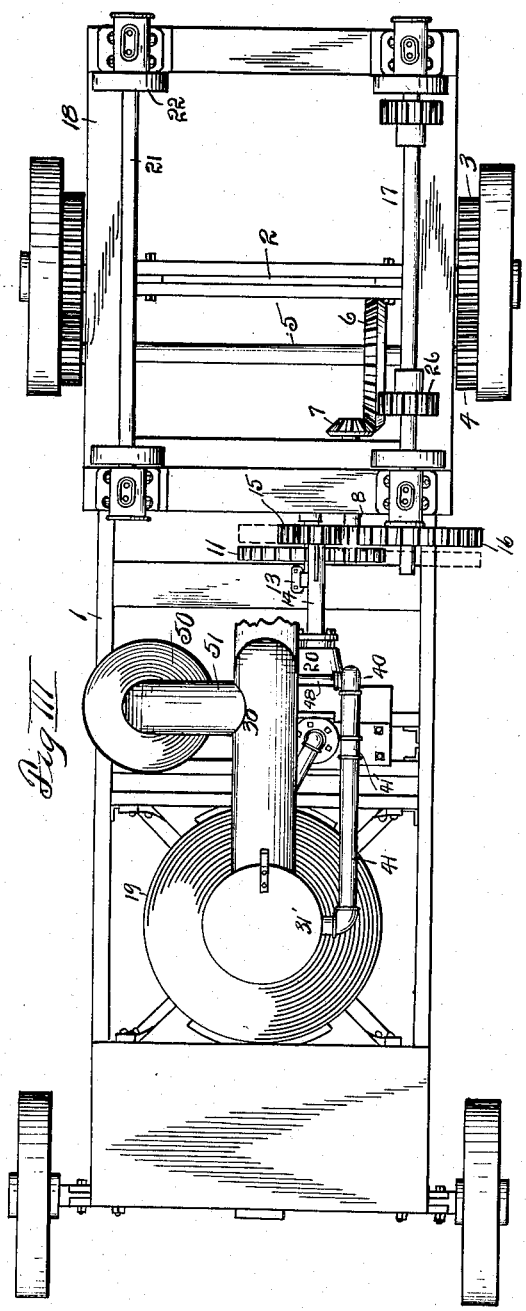

UNITED STATES PATENT OFFICE.

FRANK O. BLAKE, OF PITTSBURG, PENNSYLVANIA, ASSIGNOR OF ONE-HALF TO GEORGE H. LUTZ, OF KANSAS CITY, MISSOURI.

HEATING AND MIXING PLANT.

No. 924,132.      Specification of Letters Patent.      Patented June 8, 1909.

Application filed July 29, 1907. Serial No. 385,980.

*To all whom it may concern:*

Be it known that I, FRANK O. BLAKE, a citizen of the United States, residing at Pittsburg, in the county of Allegheny and State of Pennsylvania, have invented certain new and useful Improvements in Heating and Mixing Plants; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to a heating and mixing plant, and more particularly to a plant for heating and mixing asphalt, and has for its principal object to provide a plant of that class, comprising in part a single mixing drum, in which the raw materials from which the paving composition is formed may be heated, melted and amalgamated, thereby simplifying the ordinary process which usually consists of heating sand in one vessel, melting the asphalt or other material in a second vessel, and delivering these component parts to a third vessel where they are mixed, and from which the mixture is drained off for delivery to its final destination. In accomplishing this object, I provide a drum which may be for a greater part of a construction similar to those in ordinary use, but which I prefer to construct according to the improved design shown in the drawings and hereafter described. In combination with this drum I provide suitable means for creating a fluid heating medium, and for conducting this medium to the interior of the drum, for the purposes heretofore set forth.

In the usual process of heating and melting the asphaltic composition, which consists of applying flame to the bottom of the vessel containing the composition, the vessel is often overheated and the vitality of the composition destroyed. To obviate this disadvantage I prefer the form of heating apparatus shown in the drawings, which consists of a conduit leading from the boiler stack to an opening in the mixing drum, or from a separate furnace to said drum; which conduit is of such length that a thorough combustion of the fuel takes place before the air from the supply source reaches the drum, so that the heated air, free from flame, comes in direct contact with the material within the drum. In order to further insure the accomplishment of this object, I prefer to form the conduit in irregular contour, so that the air travels in a tortuous path from the source to the drum.

A further object of my invention is to provide an asphalt mixing plant, which may be moved from place to place in order that the materials may be mixed and the composition delivered to a point adjacent to that where the work is being done. In accomplishing this object it is necessary to provide improved details of structure, my preferred form of which is illustrated in the accompanying drawings, in which—

Figure I is a view in side elevation of an asphalt mixing plant constructed according to my invention. Fig. II is a central longitudinal view of same. Fig. III is a top plan view of the carrying and heating parts; the mixing drum being removed to better illustrate these parts.

Referring more in detail to the parts:—
1 indicates a truck frame which is mounted on a running gear, comprising the rear and front axle 2, having ordinary traction wheels. On the rear axle 2 is rigidly mounted a driving sprocket 3, which meshes with the pinion 4 on an auxiliary shaft 5. Also rigidly mounted on shaft 5 is the beveled gear wheel 6, which meshes with the pinion 7 on the end of the shaft 8, which is journaled in brackets 9, depending from the truck frame 1. Also rigidly mounted on shaft 8 is a spur wheel 10 adapted to mesh with an idler 11, slidably mounted on a shaft 12, which is journaled in brackets 13 on the truck frame 1.

14 indicates an engine shaft upon which is rigidly mounted a spur drive wheel 15, which latter is adapted to mesh with wheel 11, and with a spur wheel 16 rigidly mounted on a drum drive shaft 17, said shaft 17 being journaled in suitable bearings on a platform 18, which latter is supported on the rear end of the truck frame 1.

Supported near the front of the truck is a boiler 19, in which steam is generated for operating the engine 20.

Near the edge of platform 18 on the rear of the truck, and opposite shaft 17, is revolubly mounted a second shaft 21, and carried by shafts 17 and 21 are the wheels 22, upon which is supported the mixing drum 23; said drum being provided with flanged rings 24 for engagement with the wheel rims. On rings 24 are the spur teeth 25, and on the drum drive shaft 17 are mounted the spur wheels 26, which are adapted to engage teeth 25, for the purpose of revolving said drum when the wheel 16 is in mesh with the drive wheel 15.

Covering the ends of drum 23 are the caps 27 and 28, each having a central cut out portion, and opening into cap 27 is a heating pipe 30; around which cap 27 revolves. Pipe 30 leads to and opens into the stack 31 of the boiler 19, and projecting through pipe 30 and into the interior of the drum is a hopper 29 through which the material is fed.

33 indicates a dump board, which is supported on the edge of the opening in cap 27, and by a swinging arm 34, which is pivoted to a bracket 35, carried by platform 18. On the bottom of board 33 is an eye-bolt 36, and carried on bracket 35 is a hook 37, adapted to engage said eye-bolt when the dump board is in its receiving position, as shown in full lines in Fig. II. 38 is a step on the inner end of said board, adapted to engage the edge of the cap opening, when the board is in its non-receiving position, as shown in dotted lines in Fig. II.

39 indicates a steam exhaust pipe opening from engine 20, and carrying on its upper end a union 40 within one end of which is secured a branch pipe 41, leading to and opening into the stack 31 of boiler 19, and carried on the end of branch 41, within said stack is a jet 42, through which steam is discharged, for the purpose of creating a forced draft in the boiler.

41' indicates a valve for controlling the exhaust through pipe 41, and 31' a hood on stack 31.

47 indicates mixing blades on the inner surface of drum 23, the ends of which adjacent to the cap 28, are cupped as shown, for the purpose of elevating the material so that it may be dropped onto the dump board 38, for delivery when the latter is in its receiving position.

Opening from union 40 is a pipe 48, which projects through the heat conducting pipe 30, and carries a jet 49 through which a downward blast may be created in pipe 30, and through the mixing drum.

50 indicates an auxiliary furnace carried on frame 1, and having a heat conducting pipe 51 opening into pipe 30; said furnace being adapted to aid in furnishing heated air to drum 23, or if desired the connection between the boiler stack and drum may be dispensed with, and furnace 50 alone perform the heating function.

When in use, the parts are arranged as described, and the plant conducted by its own power to the place where the paving is to be laid. When in the proper position, the driving parts are thrown out of contact with the truck propelling gearing and into contact with the drum revolving parts, and the drum revolved upon the supporting wheels 22. The material is fed into the drum through the hopper 29, and the exhaust steam turned into pipe 30, for the purpose of creating a forced draft from the boiler flue or furnace pipe through the pipe 30 and drum 23, the hood on stack 19' being closed to aid in diverting the heated air from the boiler through the drum, or if desired, means may be provided for furnishing live steam instead of exhaust, to the blowers. When the materials have been properly mixed by reason of their agitation in the revolving drum, and raised to the desired temperature, by the heat passing from the boiler or furnace through the drum, the dump board which during the mixing process has remained in the non-receiving position indicated in dotted lines in Fig. II, is inserted through the opening in cap 28, into the interior of the drum and its outer end secured in position by means of hook 37, as shown in full lines in Fig. II. When the dump board is in this position, the material which is carried up within the drum by means of the blades 47, will drop into the inner end of the dump board, and slide down the inclined surface to be delivered to a proper receptacle or onto the pavement.

By passing the heated air through a conducting pipe before delivering it to the drum, the danger of burning the materials by bringing flame into contact therewith is obviated, although, the necessary heat for securing a proper mixture is secured; and by having the delivery end provided with the port shown, a convenient exit for the heated air, a delivery port for the asphaltic mixture, and a means for securing testing samples are provided.

I have shown engine and boiler parts, and carrying gear in combination with my improvement, which are commonly used and well known, and for that reason are not described in detail, nor claimed.

Having thus described my invention, what I claim as new therein, and desire to secure by Letters-Patent is—

1. A machine for preparing by application of heat and simultaneously mixing the assembled ingredients of asphaltic, bituminous and other like mixtures, comprising a receptacle into which the proper proportions of the materials may be introduced, constructed to confine said materials until they are voluntarily withdrawn therefrom, and containing means for continually cascading the assembled materials for any desired time; said receptacle being constructed to permit the passage of a fluid heating medium through it in a path intersecting the path through which the material is cascaded; means causing the flow of a hot fluid through said receptacle in said path; and means for withdrawing the batch of mixture at will, said withdrawing means being adjustable relatively to the receptacle.

2. A machine for preparing by application of heat, and for mixing the assembled ingredients of asphaltic, bituminous and other like mixtures, comprising a rotary drum with heads having axial openings for the passage of a fluid heating medium through the drum, but constructed to confine the ingredients within the drum until voluntarily withdrawn, means developing a current of heated fluid through the axial openings; said drum being provided with stirring and lifting means on its inner periphery adapted to cascade the materials continually for any desired time, through the current of fluid heating medium passing through the drum; and means for withdrawing the batch of mixture at will, whereby the mixture may be treated till it reaches the desired condition and then withdrawn, said means for withdrawing the batch, being adjustable relatively to the receptacle.

3. The combination with a portable carrying frame having suitable running gear and a motor carried by and adapted for propelling said frame, of a revoluble heating drum, means for supplying a fluid heating medium, a conduit for conducting the fluid heating medium to said drum, and a jet blast discharging into said conduit in a direction to cause a flow of the fluid heating medium toward said drum, and a delivery of said heating medium to the interior of said drum.

4. The combination of a revoluble heating drum adapted for receiving and delivering material during its revolution, means for supplying a fluid heating medium, a conduit for conducting the fluid heating medium from the source of supply to the interior of said drum, and a jet blast discharging into said conduit intermediate the supply source and drum and adapted to cause a flow of the heating medium toward said drum.

5. The combination of a revoluble heating drum having central end openings, means for supplying a fluid heating medium, a conduit through which the heating medium is delivered from its source through one of the drum openings, and a jet blast discharging into said conduit intermediate the supply source and drum and adapted to cause a flow of the heating medium from the supply source into said drum.

6. In an asphalt mixing plant, the combination with a revoluble drum having end openings, of means for supplying a fluid heating medium, a conduit leading from the heating medium supply means to one of the drum openings, means in said conduit intermediate the heating medium supply and drum whereby a blast is delivered in the direction of said drum, means for delivering material to said drum, and adjustable means for withdrawing the material from the drum during its rotation.

7. In an asphalt mixing plant, the combination with a truck frame and running gear, of a drum revolubly mounted on said frame and adapted for receiving and discharging material during its revolution, a motor carried by and adapted for propelling said frame and for actuating said drum, an independent fluid heating medium supply means carried on frame, a conduit connecting said supply means and said drum, and a jet blast discharging into said conduit intermediate said supply means and drum, for the purpose set forth.

In testimony whereof I affix my signature in presence of two witnesses.

FRANK O. BLAKE.

Witnesses:
JOHN F. WADE,
STANLEY SAVAGE.